United States Patent [19]

Paravigna et al.

[11] Patent Number: 4,460,010
[45] Date of Patent: Jul. 17, 1984

[54] STATION COMPRISING TWO OR MORE GAS BOTTLES FOR WELDING AND OTHER APPLICATIONS

[75] Inventors: Zivko Paravigna; Jack Boursaud, both of Genlis; Christian Tassart, Brunoy, all of France

[73] Assignee: L'Air Liquide, Societe Anonyme pour l'Etude et l'Exploitation des Procedes Georges Claude, Paris, France

[21] Appl. No.: 338,246

[22] Filed: Jan. 11, 1982

[30] Foreign Application Priority Data

Jan. 12, 1981 [FR] France .................................. 81 00362

[51] Int. Cl.³ ............................................ F16K 11/00
[52] U.S. Cl. .................................... 137/259; 137/266; 222/469; 222/472
[58] Field of Search ........................ 137/255, 259, 266; 222/3, 6, 472, 469, 129, 129.2; 239/304, 303; 266/48

[56] References Cited

U.S. PATENT DOCUMENTS

| 2,595,317 | 5/1952 | White | 239/303 X |
| 3,147,885 | 9/1964 | Sheridan | 222/129 X |
| 3,199,738 | 8/1965 | Cary | 222/129.2 |
| 3,575,319 | 4/1971 | Safianoff | 239/304 X |
| 3,729,122 | 4/1973 | Flider | 222/469 |
| 4,103,829 | 8/1978 | Zagara | 239/304 |

Primary Examiner—Alan Cohan
Attorney, Agent, or Firm—Lee C. Robinson, Jr.

[57] ABSTRACT

The present invention concerns a portable gas supply station comprising two or more gas bottles or cylinders for welding and other applications.

The gas cylinders are mounted via their necks in a block. A movable handle makes it possible to open and close the gas lines simultaneously. In its carrying position, the handle ensures closure which allows complete safety.

The gas supply station is particularly suitable for welding, soldering, flame cutting and other applications.

5 Claims, 8 Drawing Figures

FIG.1
FIG.2
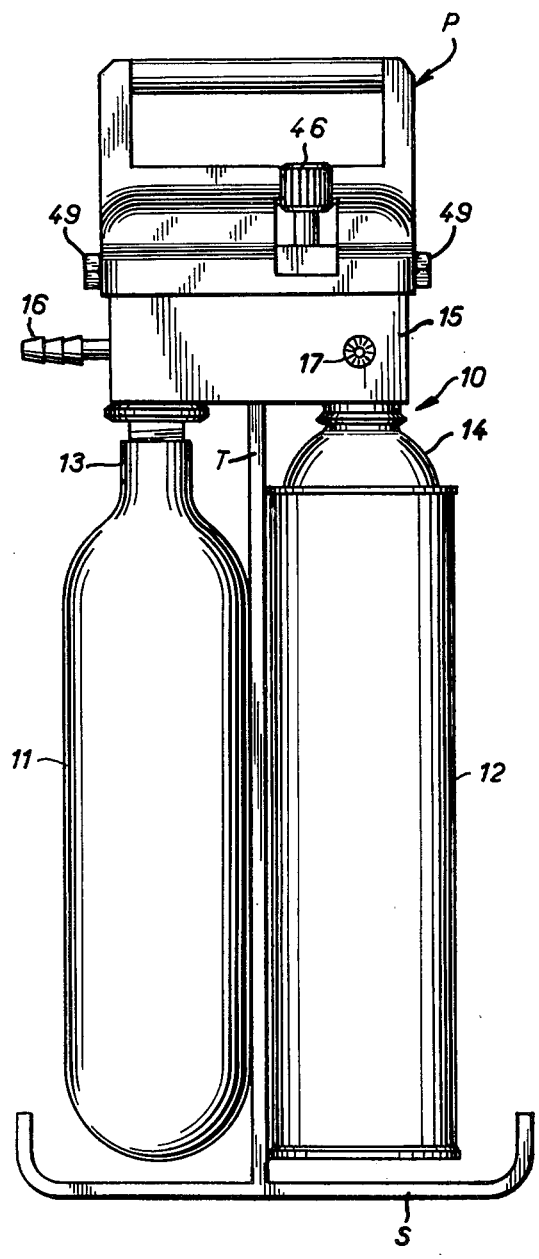
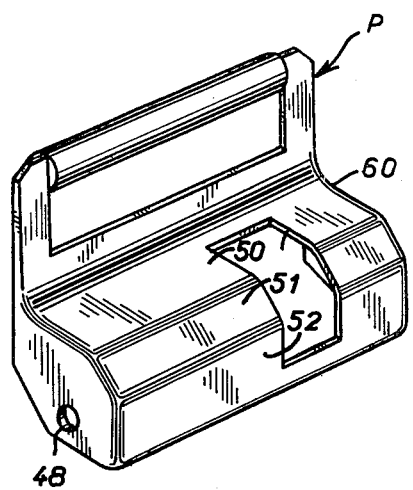

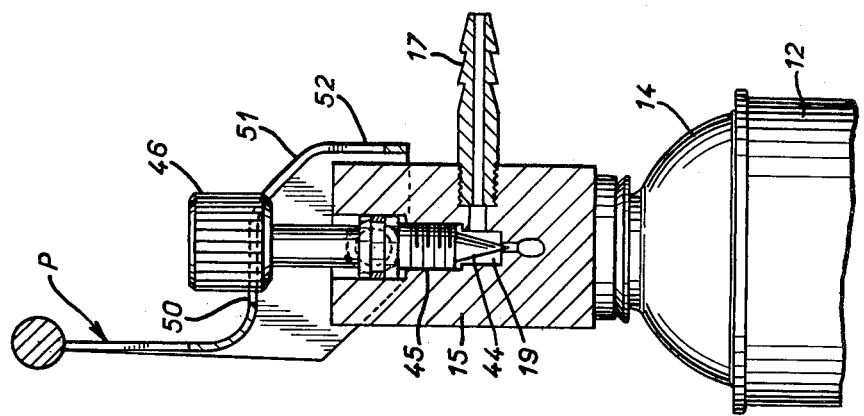
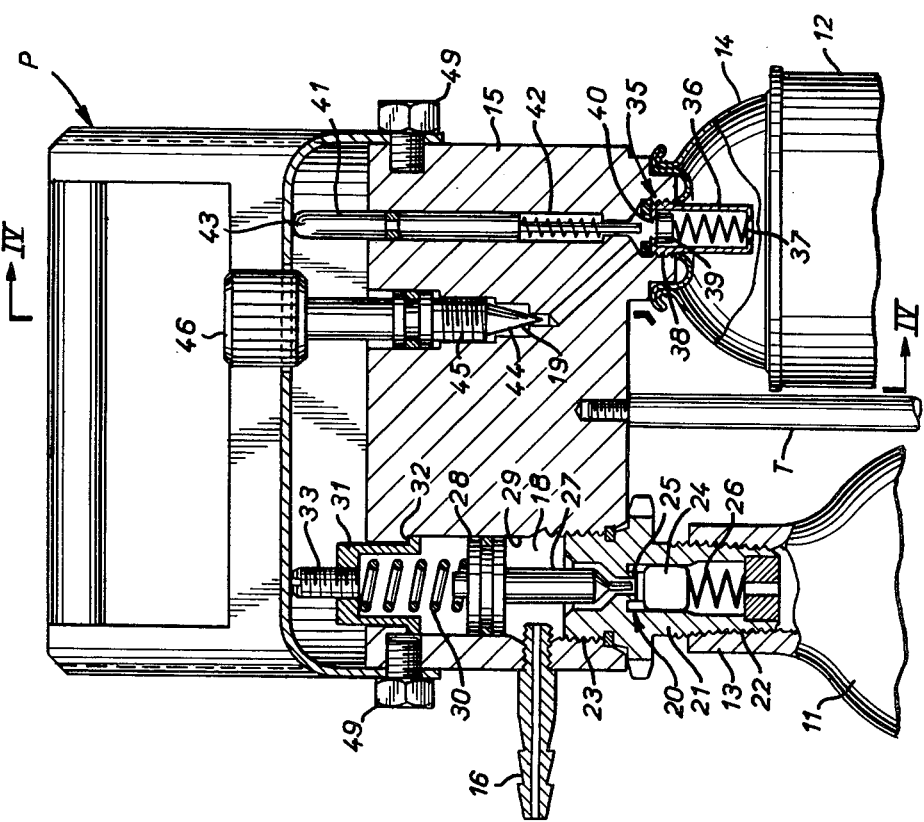

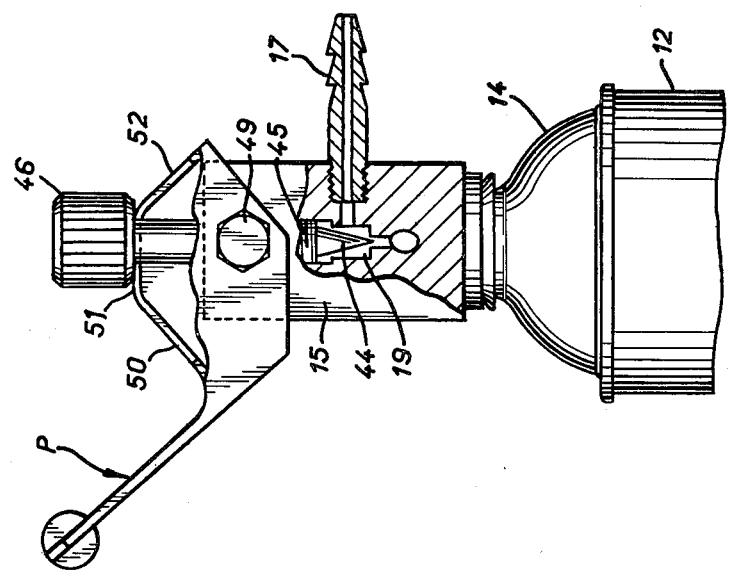
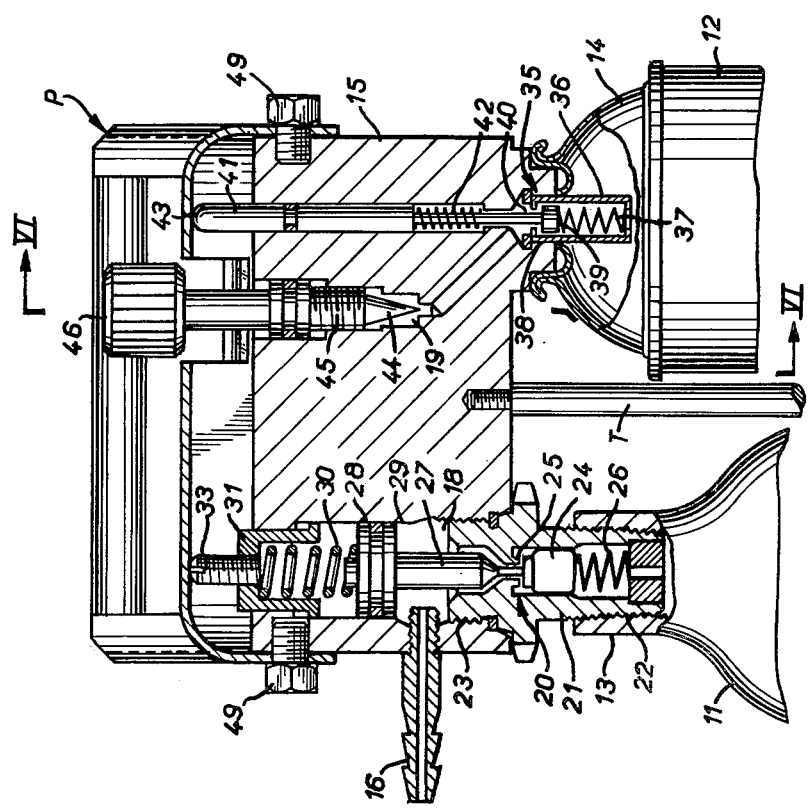

STATION COMPRISING TWO OR MORE GAS BOTTLES FOR WELDING AND OTHER APPLICATIONS

BACKGROUND OF THE INVENTION

The present invention has as its object a station comprising at least two gas bottles or cylinders combined into a portable whole, for example a bottle of comburant gas and a bottle of fuel gas.

Stations of this nature are utilised in particular for welding, soldering, flame cutting and other applications.

As a rule, the portable stations require a double action to open or close the gas lines. Furthermore, it is frequently necessary to undertake a resetting operation at each start.

It is no doubt possible to obtain rapid and simultaneous opening and closing of the two gas lines by acting on the device such as a torch supplied by the station or on an intermediate device situated between the torch and the station, but an action of this kind is commonly impossible in direct and immediate manner on the station itself, that is to say on the source.

OBJECT OF THE INVENTION

The present invention as as its object a station comprising at least two gas bottles combined into a portable whole, which is unaffected by the above disadvantages and which may be handled directly during opening and closing in very uncomplicated manner, and which has an uncomplicated and convenient structure.

SUMMARY OF THE INVENTION

In accordance with the invention, this station is characterised in that the bottles are mounted via their openings on a block which comprises a first passage between the opening of one of the bottles and a first feed connector, a first means of controlling the flow in the first passage, a second passage between the opening of the other bottle and a second feed connector, a second means of controlling the flow in the second passage, and a single common control organised to act at the same time on the first and second means of flow control.

Thanks to this arrangement it is possible to open or close the two gas lines at the same time, in complete safety, at the very source of supply and without loss of adjustment. This handling action is particularly uncomplicated and may easily be performed by laymen. In just as simple a manner, the station equally allows the heating performance of a device supplied thereby to be controlled.

A flow control means having a separate actuator is preferably incorporated and allocated to one of the passages. This control means renders it possible to meter the proportions of the gas mixture at will independently of the common control for overall opening and closing.

According to another feature, the station is equipped with a transport, or carrying handle which is arranged to form the common control for the first and second flow control means, this handle being mounted on the block for movement between a closed position and an open position. This handle thus has the dual function of being used in carrying the station and in opening and closing the gas supply lines.

In a preferred embodiment, the handle has at least one intermediate half-open position between its closed and open positions.

According to another feature, the handle may be movably mounted on the block in such manner that when it is used to carry the station, it is braced on the block in the closed position. The handle is consequently such that closure is ensured whilst the station is being carried, which gives total safety.

In a preferred embodiment, the first flow control means comprises a first actuator element which is movably, and for example slidably, mounted in the block for movement between a closed position and an open position and which is resiliently biased towards its closed position, whereas the second flow control means comprises a second actuator element which is movably, and for example slidably, mounted in the block for movement between a closed position and an open position and which is resiliently biased towards its closed position, the said actuator elements forming cam followers which cooperate with cam surfaces formed on the handle. The latter is advantageously mounted pivotally on the block.

BRIEF DESCRIPTION OF THE DRAWINGS

One embodiment of the invention will now be described by way of example and with reference to the accompanying drawings, in which:

FIG. 1 is an overall view in elevation of a station in accordance with the invention, FIG. 2 is a view in perspective of the handle of the station, FIG. 3 is an enlarged scale view of the block on which the bottles of the station are installed, and shows the block in the closed position for both gases, FIG. 4 is a corresponding view in cross-section along the broken line IV—IV of FIG. 3, FIG. 5 is a view analogous to FIG. 3 but shows the block in the half-open position, FIG. 6 is a corresponding view, in cross-section along the broken line VI—VI of FIG. 5.

DETAILED DESCRIPTION OF THE PREFERRED EMBODIMENTS

Figure 8:
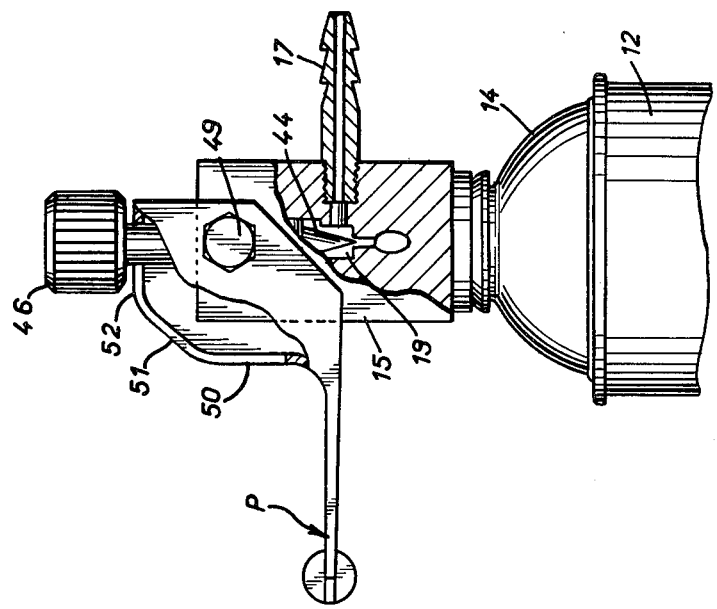
FIG. 8 is a corresponding view, in cross-section along the broken line VIII—VIII of FIG. 7.

In the accompanying drawings, there is shown in FIG. 1 a station 10 intended, for example, for welding, soldering, flame cutting or other applications.

The station 10 comprises (FIG. 1) two gas bottles 11 and 12, for example a bottle 11 of a comburant gas such as oxygen or the like, and a bottle 12 of a fuel gas such as acetylene or the like. The bottles 11 and 12 are combined into a portable whole by means of a handle (P).

More particularly, the bottles 11 and 12 are mounted in a block 15 via their necks. The block 15 is joined to a base S via a rod T, enabling the station 10 to be stood on the ground in stable manner.

The block 15 comprises (FIGS. 3 and 4) a comburant gas connector 16 and a fuel gas connector 17, which are intended to be connected to a torch by means of flexible hoses.

The block 15 comprises a first passage 18 between the opening 13 of the bottle 11 and the connector 16, and a second passage 19 between the opening 14 of the bottle 12 and the connector 17.

A first flow control means 20 is incorporated in the passage 18 and comprises a member 21 interposed between the opening 13 and the block 15, for example being screwed into the opening 13 at 22, and into the block 15 at 23. This first flow control means 20 comprises a release valve 24 which is movably installed in the member 21 and is arranged to plug an aperture 25 of the member 21. The valve 24 is biased towards its closed position of the opening 25 by means of a spring 26.

The valve 24 can also be moved towards its open position by the extremity of a rod 27 of a piston 28. The piston 28 is slidably mounted in block 15 in a cylindrical bore 29 forming part of the first passage 18 so as to be movable between a closed position (FIG. 3) and an open position (FIG. 7) of the valve 24. At the same time, the piston 28 forms a small release valve and is joined by a spring 30 to a cup 31 slidably mounted in block 15.

Figure 7:
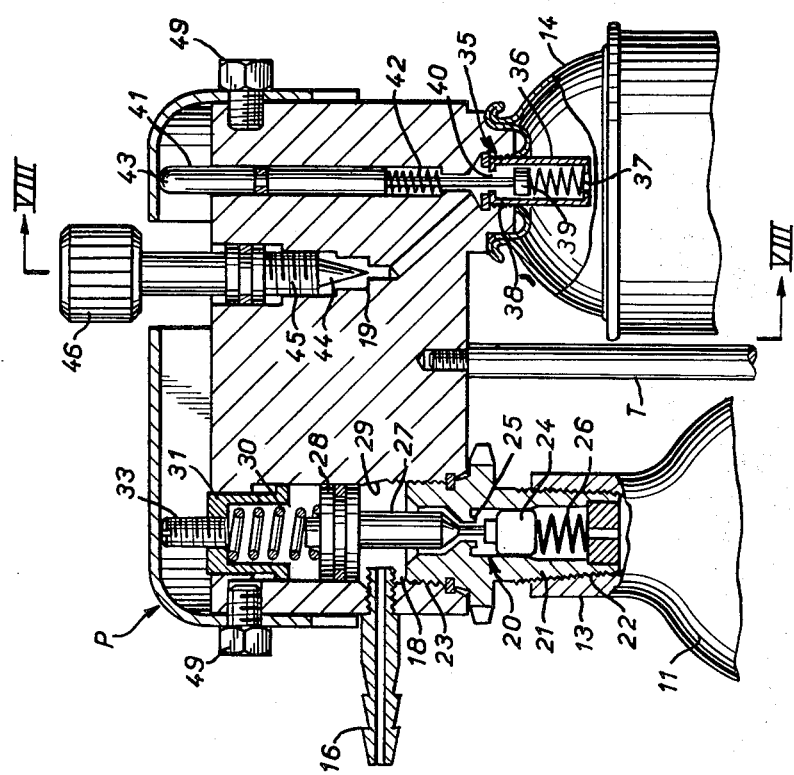
FIG. 7 is a view analogous to FIG. 3 or FIG. 5, but shows the block in the open position.

The cup 31 forms an element for actuating the valve 24 via spring 30 and piston 28. This actuator element 31 is slidably mounted in a bore 29 for movement between a closed position (FIG. 3) and an open position (FIG. 7). A shoulder 32 of the block 15 is provided to prevent accidental egress of the cup 31 from the block 15. The cup 31 has a projection 33 screwable in adjustable manner on the cup 31 which forms a cam follower as will become apparent from the following.

A second flow control means 35 is situated in the second passage 19 and comprises a member 36 mounted in the opening 14 and screwed at 38 into the block 15. This means 35 comprises a valve 39 movably mounted in the member 36 and capable of shutting off an opening 40 of the member 36. The valve 39 is biased towards its closed position by a spring 37. The valve 36 is also arranged to be opened by an opening actuation element 41 slidably mounted in the block 15 for movement between a closed position (FIG. 3) and an open position (FIG. 4). The actuator element 41 is biased towards its closed position by a spring 42 and has an extremity 43 which forms a cam follower in the same way as the projection 33, as again will become apparent from the following description.

The second passage 19 also includes flow control means 44 comprising a needle valve (FIGS. 3 and 4) which is screwed into the block 15 at 45 and which has an operating knob 46. This knob 46 passes freely through an opening 60 formed in the handle P.

The knob 46 forms an individual control for the needle valve 44, whereas a single common control is provided for the two valves 24 and 39.

This single common control is formed by the handle P. To this end, the handle P is disposed on the block 15 so as to be movable between a stable closed position (FIG. 4) and a stable open position (FIG. 8). More particularly, the handle P is pivotally mounted on the block and, for this purpose, includes holes 48 (FIGS. 2 to 4) engaged on screws 49 screwed into the block 15.

The handle P furthermore comprises a cam surface which cooperates with the followers 33 and 43. More specifically, this cam surface comprises three bearing surfaces 50, 51 and 52, which are arranged in increasing proximity to the pivot pins 49 of the handle P.

In the carrying position, the handle P is braced via its bearing surface 52 against the block 15, which corresponds to the closed position (FIG. 4). Complete safety is ensured in this manner.

In this closed position, it is the bearing surface 50 which cooperates with the followers 33 and 43 and it is apparent from FIG. 3 that these followers occupy the highest possible position in which the valves 24 and 39 are not caused to open.

In order to use the station, it is sufficient to adjust the projection 33 on the cup 31 by screwing it in or out to establish the initial stress on the spring 30, this operation commonly being performed once and for all at the factory. The user has every opportunity, by means of the knob 46, of adjusting the needle valve 44 which determines the fuel richness of the mixture fed to the torch. Once this adjustment has been made, it is set once and for all.

To release the gases, it is sufficient to lower the handle P as apparent from FIG. 6 or FIG. 8.

In a stable half-open position (FIGS. 5 and 6), it is the intermediate bearing surface 51 which comes into contact with the followers 33 and 43, which causes a small separation of the valves 24 and 39 from their corresponding seats 25 and 40.

To secure complete opening, it is sufficient to lower the handle P to the position of FIG. 8, so that the bearing surface 52 which is the closest to the pivot pins 49 comes into contact with the followers 33 and 43. In this instance, these followers 33 and 43 are lowered as far as possible and it is apparent in the fully open position (FIGS. 7 and 8) that the valves 24 and 39 are separated from their corresponding seats 25 and 40 by appreciable distances.

The particularly uncomplicated and convenient structure of the inventive station, as well as its ease of operation and its complete safety, will be appreciated.

It will be observed that the cam formed by the handle may have bearing surfaces 50, 51, 52 of any appropriate and preferably incurving form. The cam may equally have a gradual outline for metering the gas flows in continuous manner.

It should equally be observed that the station may operate with two gases of any type and even with three or more gases.

We claim:

1. A portable gas supply station for carrying at least two gas bottles each having a respective opening at an end thereof, the station comprising:
   a block having means for mounting the bottles to the block via their openings;
   respective feed connectors each connecting the opening of the associated bottle to a respective passage in the block;
   respective flow control means in each said passage for controlling flow of gas therethrough; and
   a carrying handle movably mounted on the block and operative to act simultaneously on said control means, said carrying handle being selectively movable from a stable carrying position in which it simultaneously closes all said control means, to at least one stable operative position in which it simultaneously opens said control means, and back to said transport position to simultaneously close said control means.

2. A station according to claim 1, wherein a selective mixture adjusting device, including an individual control element, is incorporated in each of said passages but one, such that the relative flow of the gases from said at least two bottles can be selectively adjusted.

3. A station according to claim 1, wherein said carrying handle has at least two operative stable positions, including at least one intermediate position in which said control means are open to less than their full extent, and an extreme position in which said control means are fully open.

4. A station according to claim 1, wherein each said flow control means includes a respective actuator element mounted in said block so as to be movable between a closed position and an open position, and resiliently biased towards its closed position, with said actuator elements having respective cam followers; and said carrying handle has respective cam surfaces formed thereon to cooperate with said cam followers to move said actuator elements when said carrying handle is moved between its open and closed positions.

5. A station according to claim 4, wherein said actuator elements are movable along respective parallel straight lines that define a plane, said carrying handle is pivotally mounted on said block substantially about an axis contained in said plane and perpendicular to said lines, and said cam surfaces are perpendicular to said lines in each operative position of said carrying handle.

* * * * *